June 19, 1923.

H. C. MAISE

VEHICLE BODY

Filed April 18, 1921

Inventor
Herman C. Maise
By Barthel & Barthel
Attorney

Patented June 19, 1923.

1,459,159

UNITED STATES PATENT OFFICE.

HERMAN C. MAISE, OF DETROIT, MICHIGAN, ASSIGNOR TO BRIGGS MANUFACTURING COMPANY, OF DETROIT, MICHIGAN, A CORPORATION OF MICHIGAN.

VEHICLE BODY.

Application filed April 18, 1921. Serial No. 462,084.

*To all whom it may concern:*

Be it known that I, HERMAN C. MAISE, a citizen of the United States of America, residing at Detroit, in the county of Wayne and State of Michigan, have invented certain new and useful Improvements in Vehicle Bodies, of which the following is a specification, reference being had therein to the accompanying drawings.

This invention relates to a vehicle body and more particularly to bodies for motor vehicles especially adapted for use as taxicabs. The object of the invention is to provide a body having a driver's compartment which may be readily converted from a closed to an opened compartment to facilitate the carrying of baggage.

A further object is to provide a driver's compartment with a side closure which may be readily folded out of the way or extended to close the side of the compartment, and further to provide an auxiliary seat for such compartment adapted to co-operate with a folding side member or closure, said closure forming a support for the seat and the seat forming a brace and support for the folding closure.

A further object is to provide a very simple construction and arrangement which may be quickly manipulated and is of inexpensive construction, said construction embodying other new and useful features hereinafter set forth.

With the above and other ends in view, the invention consists in the matters hereinafter set forth and more particularly pointed out in the appended claims, reference being had to the accompanying drawing, in which—

Figure 1:
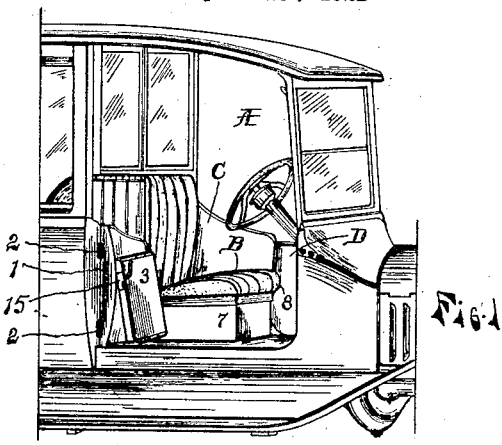
Fig. 1 is a perspective view of a portion of a vehicle body illustrative of the invention.
Figure 3:
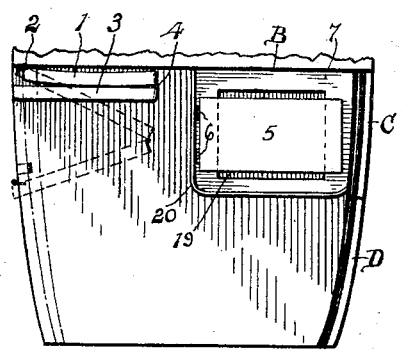
Fig. 3 is a plan view of the same showing the parts in folded position.
Figure 4:
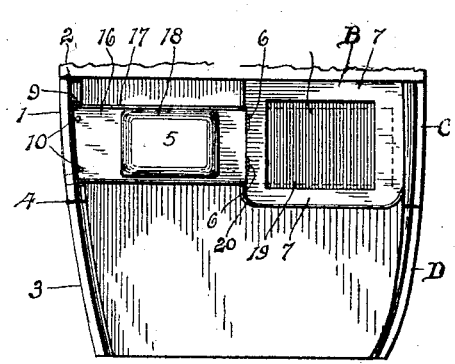
Fig. 4 is a similar view showing the parts in extended position.
Figure 2:
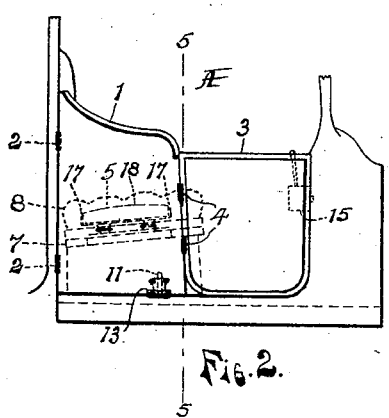
Fig. 2 is a side elevation of a portion of the body and showing the parts embodying the invention.
Figure 5:
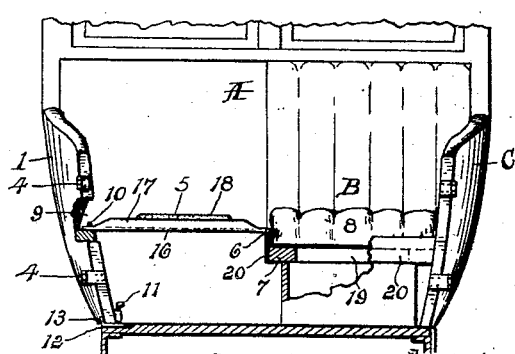
Fig. 5 is a transverse section substantially upon the line 5—5 of Fig. 2.

A vehicle body of any desired design and construction may be provided with the several features embodying this invention but as shown in the accompanying drawing the invention is applied to a taxi-cab or similar body having a driver's compartment A which is provided with the usual single seat B for the driver. The compartment or side adjacent the driver's seat may be closed as in the usual manner by the usual fixed panel C and door D, as such door and panel do not obstruct the compartment, they being on the side where the steering wheel and fixed driver's seat are located. However, such fixed panel and door, if provided at the opposite side of the compartment, prevents the carrying of trunks or other large pieces of baggage and therefore this side of the compartment is usually left open.

In the present construction a panel 1 which corresponds to the panel C is hinged at one edge to the body framing by the hinges 2 so that this panel may be swung inwardly and the door 3 which corresponds to the door D at the opposite side of the compartment, is hinged as at 4 to the forward edge of the panel, 1, said door hinges being arranged to permit the door to swing outwardly. Therefore, the panel 1 may be swung inwardly against the back wall of the compartment and the door 3 folded upon this panel so that the door and panel will extend parallel with the back wall of the compartment and lie close against the same, thus making the full space within the compartment alongside the driver's seat available for baggage and permitting trunks or other large pieces to be set into the open side of the compartment in front of the folded panel and door.

It may at times be desirable to have an extra seat so that an extra passenger may be carried and the space in the driver's compartment may be utilized when it is not occupied by baggage. An auxiliary seat 5 is therefore provided, said seat being hinged at one end, as at 6, to the framing or support for the driver's seat B. This auxiliary seat is arranged to fold over and upon the base or framing 7 of the driver's seat and when in such folded position the removable cushion 8 of the driver's seat may be placed upon top of the folded auxiliary seat. When in unfolded or extended position the auxiliary seat extends across the compartment in line with the driver's seat and is of such a length that the free end of the seat will engage within a recess 9 in the inner side of the panel 1 and rest upon the bottom of this recess, the panel thus forming a support for one end of the auxiliary seat. Arranged within the recess 9 are pins 10 projecting upwardly from the bottom of the recess and holes are provided in the auxiliary seat with which these pins engage when the seat is turned to extended position. The seat is thus locked to the panel, forming a brace for the panel and rigidly holding the same.

The panel 1 is further held when in extended position by means of a suitable fastening, preferably a locking bolt 11 secured to the inner side of the panel near its free edge to engage in a floor plate 12 secured to the floor of the compartment and having an upturned outer edge 13 which forms a stop for the panel and against which the panel is held by the bolt. The panel is thus firmly held in extended position and forms a rigid support for the door 3 which is hinged to the forward edge of the panel. This door is provided with the usual lock, as indicated at 15, to hold it in closed position in the usual manner.

To provide a very light, strong and compact auxiliary seat, the framing of said seat comprises a sheet metal plate 16 of suitable dimensions with the side edges 17 of the sheet turned upwardly forming front and rear flanges which lend strength to the sheet metal, and prevent its bending under the weight of a person sitting thereon. The cushion 18 for said seat is secured between the flanges 17 and is so positioned and of such a size relative to the opening 19 in the framing or support for the driver's seat, that said cushion will fit into this opening when the auxiliary seat is folded over upon the framing. Further, the upper edge of the framing of the driver's seat is preferably enclosed by a strip or band 20 of sheet metal with the upper edge of this strip extending above the frame a short distance to hold the cushion 8 in place when the auxiliary seat is in extended position and to form a recess to receive the auxiliary seat when said auxiliary seat is turned to folded position thereon, the upstanding flange being of substantially the same width as the width of the flanges 17 of the auxiliary seat, so that when said auxiliary seat is in folded position the bottom surface of said seat which is the top surface thereof when in folded position, will lie substantially flush with the upper edge of the surrounding flange 20.

It will be understood that the panel 1 may be of any desired heighth or shape and that the door 3 may be of a corresponding heighth where it is desired to entirely enclose the driver's compartment, and other changes in the form or arrangement of parts falling within the scope of the appended claims are contemplated and are within the spirit and scope of this invention.

What I claim is:—

1. In a vehicle body having a compartment, a swinging closure for one side of said compartment, an auxiliary seat pivotally supported at one end to be turned into engagement with said closure, said closure forming a support for one end of said auxiliary seat, and means for detachably securing the end of said auxiliary seat in engagement with said closure, said seat serving to brace and hold said closure.

2. In a vehicle body having a compartment, and a single fixed seat in said compartment, of a swinging closure for one side of said compartment, and an auxiliary seat pivotally attached at one end of said fixed seat to fold over and lie upon said fixed seat and to detachably engage said closure at its free end when in extended position and hold the closure.

3. In a vehicle body having a compartment, the combination of a single fixed seat adjacent said closed side of said compartment, a panel pivotally supported at one edge to form a partial closure for the open side of said compartment and arranged to swing inwardly to a position adjacent a back wall of the compartment, a door hinged to the free edge of the panel to fold upon the same and swing inwardly therewith, an auxiliary seat hinged at one end to said fixed seat to be folded over and lie upon the fixed seat and to be extended to detachably engage said panel at its free end, and means for connecting the free end of the auxiliary seat to said panel to hold said panel in extended position.

4. In a vehicle body having a compartment, of a fixed seat in said compartment comprising a supporting frame having an opening and a removable cushion, an auxiliary seat hinged at one end to said frame to be folded over and lie thereon and provided with a cushion to enter the opening in the frame when the auxiliary seat is turned into folded position upon said frame, a swinging closure for one side of the compartment, and means for detachably securing the free end of said auxiliary seat to said swinging closure when said seat is in extended position.

5. A vehicle body as characterized in claim 4 and wherein the swinging closure is formed with a recess in its inner side to receive the free end of the auxiliary seat when in extended position and means for detachably securing said end of said auxiliary seat on said recess.

6. A vehicle body as characterized in claim 4 and including a door hinged to the free edge of the swinging closure, said closure being in the form of a panel with a recess in its inner side to receive the free end of the auxiliary seat when said seat is extended, and means in the recess to connect the panel and seat, whereby the panel forms a support for one end of the seat and said seat forms a brace for the panel.

7. A vehicle body having a driver's compartment, a fixed panel and a door to close one side of said compartment, a fixed driver's seat adjacent said fixed panel, a panel at the open side of the compartment hinged at one edge to swing inwardly to a position against the back wall of the compartment, a door hinged to the free edge of the panel to fold thereon, an auxiliary seat hinged at one end to the fixed seat to fold over and rest upon said seat in inoperative position and to be turned to extend laterally from the fixed seat with its free end engaged with said panel and be supported thereby, means for detachably engaging said free end of said auxiliary seat with said panel for locking said end of the auxiliary seat thereto to connect the seat and panel and form a brace for the panel, and a stop to limit the outward swinging movement of the panel.

In testimony whereof I affix my signature in presence of two witnesses.

HERMAN C. MAISE.

Witnesses:
NATHAN SILVERSTINE,
ALBERT V. CRUMP.